United States Patent
Bossart et al.

(10) Patent No.: US 12,056,912 B2
(45) Date of Patent: Aug. 6, 2024

(54) PROCESS FOR DETECTION OF THE PRESENCE OF AN OBJECT IN A FIELD OF VISION OF A FLIGHT TIME SENSOR

(71) Applicants: STMicroelectronics (Grenoble 2) SAS, Grenoble (FR); STMicroelectronics (Shenzhen) R&D Co. Ltd., Shenzhen (CN)

(72) Inventors: Etienne Bossart, Claix (FR); Ji Nan Li, Shenzhen (CN); Thomas Perotto, Grenoble (FR)

(73) Assignees: STMicroelectronics (Grenoble 2) SAS, Grenoble (FR); STMicroelectronics (Shenzhen) R&D Co., Ltd., Shenzhen (CN)

( * ) Notice: Subject to any disclaimer, the term of this patent is extended or adjusted under 35 U.S.C. 154(b) by 377 days.

(21) Appl. No.: 17/512,080

(22) Filed: Oct. 27, 2021

(65) Prior Publication Data

US 2022/0138485 A1    May 5, 2022

(30) Foreign Application Priority Data

Oct. 30, 2020 (FR) ................................ 2011144

(51) Int. Cl.
*G06K 9/00*  (2022.01)
*G01S 7/481*  (2006.01)
(Continued)

(52) U.S. Cl.
CPC .......... *G06V 10/507* (2022.01); *G01S 7/4816* (2013.01); *G01S 17/08* (2013.01); *G06V 20/00* (2022.01)

(58) Field of Classification Search
CPC ....... G01N 21/6408; G01N 2021/6419; G01N 2021/6421; G01N 2021/6439; G01N 21/6428; G01N 21/648; G01N 2201/08; G01N 2201/12; G01N 2021/6441; G01N 2021/6463; G01N 2021/6471; G01N 21/6454; G01N 2201/064; G01N 2201/0696; G01N 2201/062; G01S 17/10; G01S 7/4865; G01S 7/4863; G01S 7/4816; G01S 17/89; G01S 17/894; G01S 17/931;
(Continued)

(56) References Cited

U.S. PATENT DOCUMENTS

2012/0154786 A1    6/2012 Gosch et al.
2015/0125030 A1*   5/2015 Suzuki .................. A61B 5/441
                                                         382/103
(Continued)

FOREIGN PATENT DOCUMENTS

EP    2469296 A1    6/2012
WO    2020009011 A1  1/2020

*Primary Examiner* — Alex Kok S Liew
(74) *Attorney, Agent, or Firm* — Slater Matsil, LLP

(57) ABSTRACT

In an embodiment a method for detecting a presence of at least one object in a field of view of a time of flight sensor includes successively generating, by the time of flight sensor, histograms, each histogram comprising several classes associating a number of photons detected at a given acquisition period, adding several successively generated histograms so as to obtain a summed histogram and analyzing the summed histogram to detect the presence of at least one object in the field of view of the time of flight sensor.

20 Claims, 2 Drawing Sheets

(51) Int. Cl.
*G01S 17/08* (2006.01)
*G06V 10/50* (2022.01)
*G06V 20/00* (2022.01)

(58) Field of Classification Search
CPC ........ G01S 7/4815; G01S 7/487; G01S 7/484;
G01S 17/86; G01S 7/4876; G01S 17/42;
C12Q 1/6874; C12Q 1/6869; H04N
23/56; H04N 13/254; H04N 13/271;
H04N 23/10; H04N 13/239
See application file for complete search history.

(56) References Cited

U.S. PATENT DOCUMENTS

| | | | |
|---|---|---|---|
| 2018/0253404 A1 | 9/2018 | Moore et al. | |
| 2018/0322652 A1* | 11/2018 | Lee | G06T 7/74 |
| 2019/0361098 A1* | 11/2019 | Hollmann | G01S 17/89 |
| 2021/0116572 A1 | 4/2021 | Kimura | |

* cited by examiner

PROCESS FOR DETECTION OF THE PRESENCE OF AN OBJECT IN A FIELD OF VISION OF A FLIGHT TIME SENSOR

CROSS-REFERENCE TO RELATED APPLICATIONS

This application claims the benefit of French Patent Application No. 2011144, filed on Oct. 30, 2020, which application is hereby incorporated herein by reference.

TECHNICAL FIELD

The disclosure relates to time of flight sensors, and more particularly, to the detection of the presence of object(s) in a field of view of such a sensor from the data supplied by this sensor.

BACKGROUND

A time of flight sensor is a sensor using the propagation of light to measure distances between objects and this sensor.

In particular, a time of flight sensor is configured to be able to emit optical light radiation, for example of the infrared or laser type, towards an object and to measure a time of flight, that is to say the time that passes between the emission of this radiation and its reception by the sensor after the reflection of the radiation on the object. The time-of-flight measurement allows to determine the distance between the object and the sensor, knowing the speed of the radiation.

The radiation reception can be accomplished using sensitive single photon detectors.

Single photon avalanche diodes, commonly referred to by the person skilled in the art by the acronym "SPAD", are known in particular as single photon sensitive detectors.

In order to develop accurate timing information on the arrival of each single photon from optical light radiation, sensitive single photon detectors can be adapted to generate time histograms of the number of photons detected.

Such time histograms thus comprise several classes, each associating a number of photons detected at a given acquisition period.

Some classes of such histograms can be representative of photons resulting from the radiation reflected by an object. These classes are therefore representative of the presence of an object in the field of view of the time of flight sensor. These classes generally have a number of photons greater than a given threshold below which the number of photons detected is that of ambient noise.

Algorithms are then implemented to identify the classes of the histogram representative of photons from the radiation reflected by one or more objects.

In particular, it is possible to identify the classes representative of the presence of an object by comparing the number of photons detected from the classes to a fixed threshold greater than or equal to the given threshold delimiting the ambient noise.

However, these identification algorithms may be insufficient to identify all the classes representative of the presence of an object.

In particular, in order to be able to detect the classes representative of the presence of an object, the algorithms may require a high signal-to-noise ratio. Indeed, when the signal-to-noise ratio is low, classes representative of the presence of an object may be obscured by classes representative of noise.

Thus, poorly reflecting objects are for example difficult to detect because the number of photons of reflected radiation that can be sensed is relatively close to the number of photons of ambient noise that can be sensed.

SUMMARY

Embodiments provide a method for improving the detection of object(s) in the field of view of a time of flight sensor.

Embodiments provide a method for detecting the presence of at least one object in a field of view of a time of flight sensor, the method comprising successively generating histograms by the time of flight sensor, each histogram comprising several classes associating a number of photons detected at a given acquisition period, adding several successively generated histograms so as to obtain a summed histogram, and analyzing the summed histogram to detect the presence of at least one object in the field of view of the time of flight sensor.

The analysis of the summed histogram can be performed according to methods well known to the person skilled in the art. For example, the analysis of the summed histogram can be carried out by applying the method described by the United States Patent Application Publication No. 2018/0253404 which is incorporated herein by reference.

The generation of a histogram is performed after emission of optical radiation. The acquisition periods are defined relative to an instant of emission of this optical radiation by the time of flight sensor.

The sum of the histograms consists in adding the number of photons detected from the classes of the different histograms acquired at the same acquisition period compared to the instants of emission which precede the generations of these histograms.

Thus, the classes of these histograms representative of the presence of the same object located at a given distance from the sensor are added together.

The sum of the histograms allows to better distinguish the classes representative of the presence of an object in the field of view of the sensor from the classes representative of ambient noise.

In particular, the number of photons of the classes representative of the presence of an object does not vary, or only slightly varies, between the different histograms for the same acquisition period.

Furthermore, the number of photons of classes representative of ambient noise may vary for classes of different histograms for the same acquisition period.

In particular, in some histograms generated by the time of flight sensor, classes representative of the presence of an object can be more easily distinguished from classes representative of ambient noise because the number of photons of the ambient noise can be sufficiently lower than the number of photons of radiation reflected by the object(s).

The sum of the histograms allows increasing a difference between the number of photons of the classes representative of the presence of an object of a histogram and the number of photons of the classes representative of an ambient noise of this histogram.

In particular, the difference between the number of photons of the classes representative of the presence of an object of the summed histogram and the number of photons of the classes representative of an ambient noise of this summed histogram is equal to the sum of the differences between the number of photons of the classes representative of the presence of an object of the generated histograms and the number of photons of the classes representative of an ambient noise of these generated histograms.

Thus, in the summed histogram, the classes representative of the presence of an object stand out more from the classes representative of the ambient noise.

It is therefore easier to distinguish the classes representative of the presence of an object from the classes representative of an ambient noise in the summed histogram.

Such a method therefore allows to improve the detection of the presence of an object in the field of view of the time of flight sensor. Such a method is therefore more reliable. Such a method also allows to improve the detection range of a time of flight sensor.

In an advantageous embodiment, the method comprises storing successively generated histograms in a queue in the memory of the time of flight sensor, the summed histogram being obtained by summing the histograms stored in the queue.

When the queue is full and a new histogram is generated, the oldest histogram stored in the queue is cleared and the new histogram is stored in the queue.

In an advantageous embodiment, the queue has a capacity allowing to store a maximum of six histograms simultaneously.

Such queue capacity is sufficient to improve the detection of the presence of object(s) in the field of view of the sensor.

In an advantageous embodiment, the method comprises, before storing a newly generated histogram, comparing this newly generated histogram to a histogram generated directly before the newly generated histogram, and then clearing each histogram stored in the queue if the newly generated histogram is sufficiently different from the histogram generated directly before the newly generated histogram.

In particular, the time of flight sensor allows to sense a configuration of a scene in the field of view of the sensor. The scene can comprise one or more objects.

When the scene changes in the field of view of the time of flight sensor, the time of flight sensor generates a histogram different from the histogram generated before the modification of the scene. The classes representative of the presence of an object in the new histogram may therefore be different from those of the histogram generated before the modification of the scene.

Such a method is therefore adapted for clearing the histograms of the queue when the scene in the field of view of the time of flight sensor changes.

The sum of the histograms is therefore performed only with histograms representative of the same scene.

This may allow to prevent distortion of the object presence detection based on histograms generated for different scene configurations in the field of view of the time of flight sensor.

In an advantageous embodiment, the method comprises calculating a correlation coefficient between the newly generated histogram and the histogram generated directly before the newly generated histogram, then comparing the correlation coefficient to a threshold in order to determine whether the newly generated histogram is sufficiently different from the histogram generated directly before.

In an advantageous embodiment, adding to obtain a summed histogram is performed each time a new histogram is stored in the queue.

Thus, a summed histogram can be obtained after each generation of a histogram by the time of flight sensor.

It is therefore possible to carry out a summed histogram processing to detect one or more object(s) in the field of view of the time of flight sensor after each histogram generation.

Of course, the fuller the queue, the more easily the summed histogram allows to detect classes representative of the presence of an object in the field of view of the time of flight sensor.

Further embodiments provide a time of flight sensor comprising an emitter (e.g., emission means) configured to emit optical radiation, a detector (e.g., reception means) configured to detect photons of optical radiation, a generator (e.g., generation means) configured to successively generate histograms, each histogram comprising several classes each associating a number of photons detected at a given acquisition period, and a processor (e.g., processing means) configured to add several successively generated histograms so as to obtain a summed histogram and analyze the summed histogram to detect the presence of at least one object in the field of view of the time of flight sensor.

In an advantageous embodiment, the sensor comprises a memory having a queue configured to successively store the generated histograms. The summed histogram is obtained by summing the histograms stored in the queue.

In an advantageous embodiment, the queue has a capacity allowing to store a maximum of six histograms simultaneously.

In an advantageous embodiment, the processing means are configured to compare a newly generated histogram to a histogram generated directly before the newly generated histogram, then clear each histogram stored in the queue if the newly generated histogram is sufficiently different from the histogram generated directly before the newly generated histogram, then store the newly generated histogram in the queue.

In an advantageous embodiment, the processing means are configured to calculate a coefficient of correlation between the newly generated histogram and the histogram generated directly before the newly generated histogram, then to compare the correlation coefficient with a threshold in order to determine whether the newly generated histogram is sufficiently different from the histogram generated directly before.

In an advantageous embodiment, the processing means are configured to sum the histograms of the queue each time a new histogram is stored in the queue.

BRIEF DESCRIPTION OF THE DRAWINGS

Other advantages and features of the invention will become apparent upon examining the detailed description of implementations and embodiments, which are in no way limiting, and of the appended drawings wherein.

DETAILED DESCRIPTION OF ILLUSTRATIVE EMBODIMENTS

Figure 1:
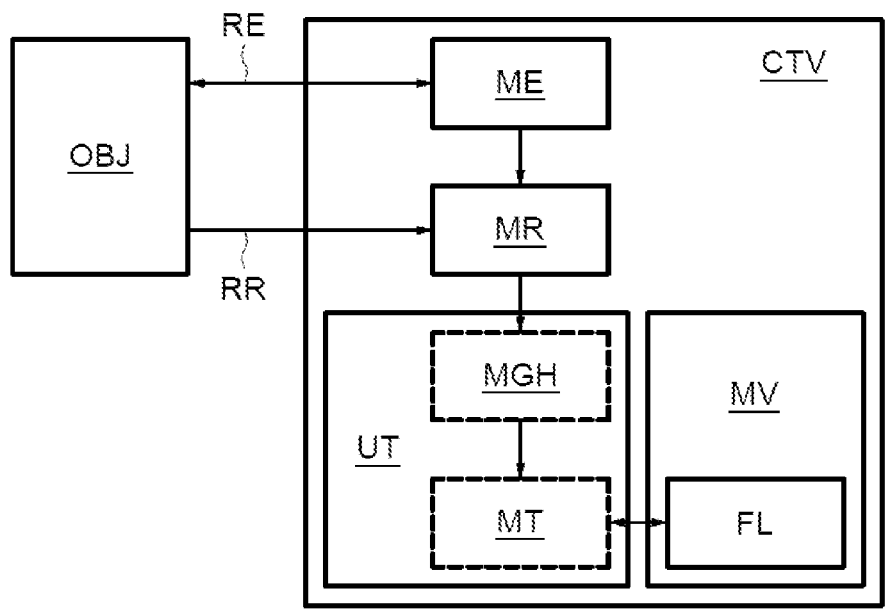
FIG. 1 illustrates a time of flight sensor CTV according to an embodiment.

The time of flight sensor CTV comprises emission means ME configured to periodically emit optical radiation RE.

The emission means ME may be a vertical-cavity surface-emitting laser diode, commonly known to the person skilled in the art by the acronym "VCSEL".

If one or more objects OBJ are present in the field of optical radiation, the time of flight sensor CTV can receive reflected optical radiation RR resulting from a reflection of optical radiation on the object(s) OBJ.

The time of flight sensor CTV thus comprises receiving means MR configured to receive optical radiation RR reflected by the objects OBJ in a field of view of the time of flight sensor. The field of view of the time of flight sensor is defined by these receiving means MR.

The receiving means MR comprise one or more single photon detectors, here for example an array of single photon detectors DET of the single photon avalanche diode (SPAD) type known per se to the person skilled in the art.

The time of flight sensor CTV comprises histogram generation means MGH configured to generate histograms from the signals provided by the array of single photon detectors. In particular, the histogram generation means MGH are configured to count the number of photons detected by the receiving means MR over several successive acquisition periods.

The histogram generation means MGH are thus configured to produce histograms comprising different classes. Each class associates a number of photons detected with a given acquisition period.

The histogram generation means MGH are configured to produce a histogram after each emission of optical radiation by the emission means ME. The acquisition periods are defined relative to an instant of emission of optical radiation by the time of flight sensor.

Preferably, the histogram generation means MGH are software means implemented by a processing unit UT of the time of flight sensor.

The processing unit UT can be a microprocessor, for example.

The time of flight sensor also comprises processing means MT.

The processing means MT are configured to receive the histograms generated by the histogram generation means MGH.

The processing means MT are configured to detect the presence of object(s) in the field of view of the sensor from the histograms generated by the generation means MGH, as described below.

Preferably, the processing means MT are software means implemented by the processing unit UT of the time of flight sensor.

The time of flight sensor further comprises a memory MV comprising a queue FL (also known to the person skilled in the art by the acronym FIFO for "First in, first out"). Preferably, the memory MV is a volatile memory.

This queue FL is configured to store several histograms generated successively by the histogram generation means MGH.

Preferably, the queue FL has a capacity allowing to store a maximum of six successively generated histograms.

The processing means MT are configured to add a new histogram in the queue FL as soon as this new histogram is generated by the histogram generation means MGH.

When the queue FL is full and a new histogram is generated, the oldest histogram stored in the queue FL is cleared and the new histogram is stored in the queue FL.

Moreover, the processing means MT are configured to carry out respectively postprocessing operations on the generated histograms. The postprocessing operations allow to detect the presence of one or more objects in the field of view of the sensor from the generated histograms.

In particular, the processing means MT are configured to sum the histograms stored in the queue FL so as to obtain a summed histogram.

Furthermore, the processing means MT are configured to analyse the summed histogram so as to detect the classes of this histogram which are representative of the presence of an object in the field of view of the sensor.

The analysis of the summed histogram can be carried out according to methods well known to the person skilled in the art. For example, the analysis of the summed histogram can be carried out by applying the method described by the United States Patent Application Publication No. 2018/0253404.

Moreover, before storing a new histogram in the queue FL, the processing means MT are configured to compare the newly generated histogram with a histogram generated directly before the newly generated histogram.

In particular, in order to compare these two histograms, the processing means MT are configured to calculate a coefficient of correlation between these two histograms.

The processing means MT are configured to compare the correlation coefficient with a threshold. The threshold is defined during the design of the sensor.

Such a comparison allows to know whether a scene in the field of view of the sensor during the acquisition of the data of the newly generated histogram is identical to that during the acquisition of the data of the histogram generated just before the newly generated histogram. For example, at least one object may have been moved in the scene.

If the correlation coefficient is less than the threshold, this indicates that the scenes between the two acquisitions are not the same.

If the correlation coefficient is greater than the threshold, this indicates that the scene has not changed between the two acquisitions.

When the correlation coefficient is less than the threshold, the processing means MT are configured to clear the histograms stored in the queue FL before storing the newly generated histogram in the queue FL.

When the correlation coefficient is greater than the threshold, the processing means MT are configured to directly store the newly generated histogram in the queue FL.

Figure 2:
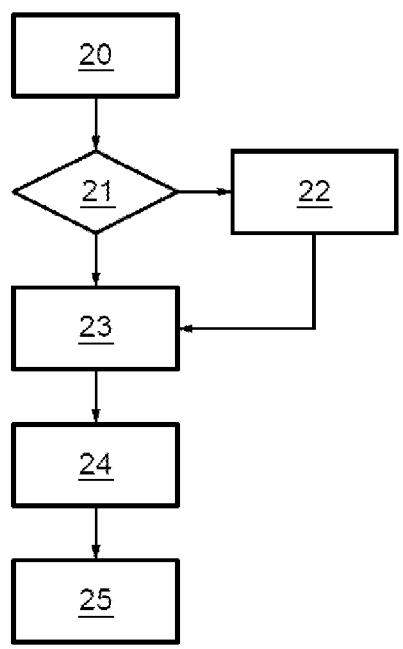
FIG. 2 illustrates a method for detecting object(s) in the field of view of a time of flight sensor as described above in relation to FIG. 1.

The method illustrated in FIG. 2 is implemented each time an optical radiation is emitted by the emission means ME, and in particular, after each generation of a histogram by the histogram generation means MGH.

The method comprises a step 20 wherein the processing means MT receive a histogram newly generated by the histogram generation means MGH.

The method then comprises a step 21 wherein the processing means MT compare the newly generated histogram with a histogram generated directly before the newly generated histogram.

In particular, in order to compare these two histograms, the processing means MT calculate a coefficient of correlation between these two histograms.

The processing means MT then compare the correlation coefficient with a threshold. As seen previously, the threshold is defined during the design of the sensor.

Such a comparison allows to know whether the scene in the field of view of the sensor during the acquisition of the data of the newly generated histogram is identical to that during the acquisition of the data of the histogram generated just before the newly generated histogram. Indeed, the scene can change over time. For example, at least one object may have moved in the scene relative to the time of flight sensor.

If the correlation coefficient is less than the threshold, this indicates that the scenes between the two acquisitions are not the same.

If the correlation coefficient is greater than the threshold, this indicates that the scene has not changed between the two acquisitions.

If the correlation coefficient is less than the threshold, the processing means MT clear, in step 22, the histograms stored in the queue FL. Then, the processing means MT add the histogram newly generated in the queue FL in step 23.

If the correlation coefficient is greater than the threshold, the processing means MT directly add the newly generated histogram in the queue FL in step 23.

Then, the method comprises a step 24 wherein the processing means MT sum the histograms stored in the queue FL so as to obtain a summed histogram.

Thus, the summed histogram can be equal to the sum of several histograms when several histograms are stored in the queue FL, or else equal to the single histogram stored in the queue FL, when the queue FL has been cleared for example.

In particular, the sum of the histograms consists in adding the number of photons detected from the classes of the different histograms acquired at the same acquisition period compared to an instant of emission of optical radiation by the emission means ME.

Figure 3:
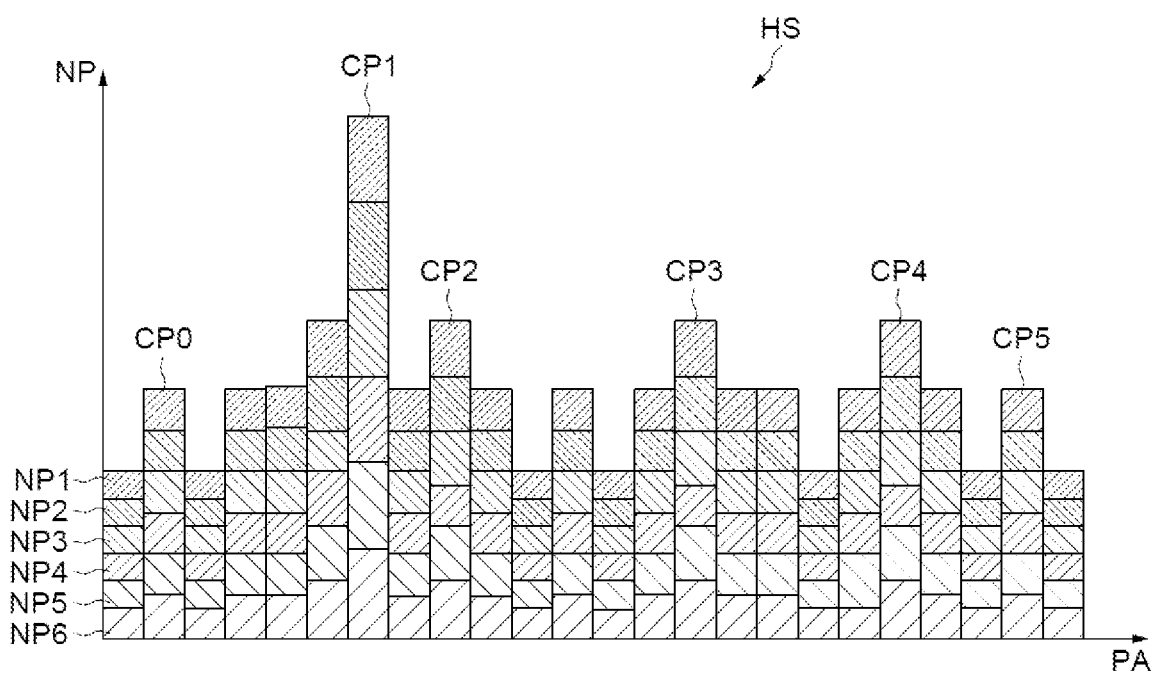
FIG. 3 illustrates an example of a summed histogram.

An example of a summed histogram HS is shown in FIG. 3. The summed histogram results from the sum of six successively generated histograms. The summed number NP of detected photons is represented on the ordinate and the acquisition periods PA are represented on the abscissa. For each detected histogram, the number of detected photons NP1, . . . , NP6 at each acquisition period is illustrated in the histogram summed in FIG. 3.

The sum of the histograms is carried out only with histograms representative of the same scene.

Indeed, as seen previously, when the scene changes, the histograms stored previously in the queue are cleared and are therefore no longer used to obtain a summed histogram.

This allows to prevent distortion of the object presence detection based on histograms generated for different scenes in the field of view of the time of flight sensor.

Then, the method comprises a step 25 wherein the summed histogram is analyzed by the processing means MT in order to determine the classes of the summed histogram representative of the presence of an object.

As seen above, the analysis of the summed histogram can be performed according to methods well known to the person skilled in the art. For example, the analysis of the summed histogram can be carried out by applying the method described by the United States Patent Application Publication No. 2018/0253404.

However, by carrying out the analysis on the summed histogram and not directly on a histogram generated by the histogram generation means MGH, it is easier to detect the classes representative of the presence of an object.

Indeed, the sum of the histograms allows to better distinguish the classes representative of the presence of an object in the field of view of the sensor from the classes representative of ambient noise.

In particular, the number of photons of the classes representative of the presence of an object does not vary, or only slightly varies, between the different histograms for the same acquisition period.

Furthermore, the number of photons of classes representative of ambient noise may vary for classes of different histograms for the same acquisition period.

Thus, in some histograms generated by the time of flight sensor, classes representative of the presence of an object can be more easily distinguished from classes representative of ambient noise because the number of photons of the ambient noise can be sufficiently lower than the number of photons of radiation reflected by the object(s).

Furthermore, the sum allows to increase a difference between the number of photons of the classes representative of the presence of an object of a histogram and the number of photons of the classes representative of an ambient noise of this histogram.

In particular, the difference between the number of photons of the classes representative of the presence of an object of the summed histogram and the number of photons of the classes representative of an ambient noise of this summed histogram is equal to the sum of the differences between the number of photons of the classes representative of the presence of an object of the generated histograms and the number of photons of the classes representative of an ambient noise of these generated histograms.

Thus, in the summed histogram, the classes representative of the presence of an object stand out more from the classes representative of the ambient noise.

It is therefore easier to distinguish the classes representative of the presence of an object from the classes representative of an ambient noise in the summed histogram.

For example, in the summed histogram HS shown in FIG. 3, classes CP0 to CP5 are representative of the presence of object(s) in the field of view of the time of flight sensor.

Such a method therefore allows to improve the detection of the presence of an object in the field of view of the time of flight sensor. Such a method is therefore more reliable. Such a method also allows to improve the detection range of a time of flight sensor.

The method is implemented after each generation of a histogram by the histogram generation means MGH.

A processing operation of a summed histogram is therefore performed after each histogram generation to detect one or more object(s) in the field of view of the time of flight sensor.

Of course, the fuller the queue FL when the sum is performed in step 24, the more easily the obtained summed histogram allows to detect classes representative of the presence of an object in the field of view of the time of flight sensor. Indeed, the fuller the queue FL, the greater the difference between the number of photons of classes representative of the presence of an object and the number of photons of classes representative of ambient noise.

What is claimed is:

1. A method for detecting a presence of at least one object in a field of view of a time of flight sensor, the method comprising:

successively generating, by the time of flight sensor, histograms, each histogram comprising several classes and each class being associated with a number of photons detected at a given acquisition period;

after generating a histogram, storing the histogram in a queue in a memory of the time of flight sensor;

before storing a newly generated histogram, comparing the newly generated histogram to a histogram generated directly before the newly generated histogram; and after comparing:

clearing each histogram stored in the queue when the newly generated histogram is sufficiently different from the histogram generated directly before the newly generated histogram according to a first implementation; and storing the newly generated histogram in the queue, adding several successively generated histograms stored in the queue so as to obtain a summed histogram when the newly generated histogram is not sufficiently different from the histogram generated directly before the newly generated histogram and analyzing the summed histogram to detect the presence of at least one object in the field of view of the time of flight sensor according to a second implementation.

2. The method according to claim 1, wherein the queue has a capacity for storing a maximum of six histograms simultaneously.

3. The method according to claim 1, further comprising:
calculating a correlation coefficient between the newly generated histogram and the histogram generated directly before the newly generated histogram; and
after calculating, comparing the correlation coefficient to a threshold in order to determine whether the newly generated histogram is sufficiently different from the histogram generated directly before.

4. The method according to claim 1, wherein adding several successively generated histograms is performed each time a new histogram is stored in the queue.

5. A time of flight sensor comprising:
an emitter configured to emit optical radiation;
a detector configured detect photons of reflected optical radiation;
a generator configured to successively generate histograms, each histogram comprising several classes and each class being associated with a number of photons detected at a given acquisition period;
a memory having a queue configured to successively store the generated histograms; and
a processor configured to:
before storing a newly generated histogram, compare the newly generated histogram to a histogram generated directly before the newly generated histogram;
when the newly generated histogram is sufficiently different from the histogram generated directly before the newly generated histogram, clear all histograms stored in the queue according to a first implementation; and
when the newly generated histogram is not sufficiently different from the histogram generated directly before the newly generated histogram, store the newly generated histogram in the queue, add several successively generated histograms stored in the queue so as to obtain a summed histogram and analyze the summed histogram to detect a presence of at least one object in a field of view of the time of flight sensor according to a second implementation.

6. The sensor according to claim 5, wherein the summed histogram is obtained by summing all histograms stored in the queue.

7. The sensor according to claim 5, wherein the queue has a capacity for storing a maximum of six histograms simultaneously.

8. The sensor according to claim 5, wherein the processor is configured to:
calculate a correlation coefficient between the newly generated histogram and the histogram generated directly before the newly generated histogram, and
then compare the correlation coefficient with a threshold in order to determine whether the newly generated histogram is sufficiently different from the histogram generated directly before.

9. The sensor according to claim 5, wherein the processor is configured to add the histograms of the queue each time a new histogram is stored in the queue.

10. The sensor according to claim 5, wherein the emitter is a laser, wherein the detector is an array of photodetectors, and wherein the generator is a first microprocessor and the processor is a second microprocessor.

11. The sensor according to claim 10, wherein the first and second microprocessors are a single microprocessor.

12. The sensor according to claim 10, wherein the array of photodetectors are an array of single photon avalanche diodes.

13. A time of flight sensor comprising:
an emitter configured to emit optical radiation;
a detector configured detect photons of reflected optical radiation;
a generator configured to successively generate histograms, each histogram comprising being associated with a number of photons detected at a given acquisition period;
a memory having a queue configured to successively store the generated histograms; and
a processor configured to:
before storing a newly generated histogram, compare the newly generated histogram to a histogram generated directly before the newly generated histogram;
when the newly generated histogram is sufficiently different from the histogram generated directly before the newly generated histogram, clear all histograms stored in the queue according to a first implementation; and
when the newly generated histogram is not sufficiently different from the histogram generated directly before the newly generated histogram, store the newly generated histogram in the queue, add several successively generated histograms stored in the queue so as to obtain a summed histogram and analyze the summed histogram to detect a presence of at least one object in a field of view of the time of flight sensor according to a second implementation.

14. The sensor according to claim 13, wherein the summed histogram is obtained by summing all histograms stored in the queue.

15. The sensor according to claim 13, wherein the queue has a capacity for storing a maximum of six histograms simultaneously.

16. The sensor according to claim 13, wherein the processor is configured to:
calculate a correlation coefficient between the newly generated histogram and the histogram generated directly before the newly generated histogram, and
then compare the correlation coefficient with a threshold in order to determine whether the newly generated histogram is sufficiently different from the histogram generated directly before.

17. The sensor according to claim 13, wherein the processor is configured to add the histograms of the queue each time a new histogram is stored in the queue.

18. The sensor according to claim 13, wherein the emitter is a laser, wherein the detector is an array of photodetectors, and wherein the generator is a first microprocessor and the processor is a second microprocessor.

19. The sensor according to claim 18, wherein the first and second microprocessors are a single microprocessor.

20. The sensor according to claim 18, wherein the array of photodetectors are an array of single photon avalanche diodes.

\* \* \* \* \*